United States Patent
Bull et al.

(10) Patent No.: US 8,331,955 B2
(45) Date of Patent: Dec. 11, 2012

(54) ROBUST DOWNLINK FRAME SYNCHRONIZATION SCHEMES IN CDMA WIRELESS NETWORKS FOR GEO-LOCATION

(75) Inventors: Jeffrey F. Bull, Chalfont, PA (US); Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 97 days.

(21) Appl. No.: 12/980,098

(22) Filed: Dec. 28, 2010

(65) Prior Publication Data

US 2012/0165037 A1 Jun. 28, 2012

(51) Int. Cl.
H04W 24/00 (2009.01)

(52) U.S. Cl. ............... 455/456.1; 455/456.2; 455/456.5; 455/456.6; 455/561

(58) Field of Classification Search .................. None
See application file for complete search history.

(56) References Cited

U.S. PATENT DOCUMENTS

| | | | |
|---|---|---|---|
| 4,728,959 A | 3/1988 | Maloney et al. | |
| 5,327,144 A | 7/1994 | Stilp et al. | |
| 5,608,410 A | 3/1997 | Stilp et al. | |
| 6,047,192 A | 4/2000 | Maloney et al. | |
| 6,108,555 A | 8/2000 | Maloney et al. | |
| 6,184,829 B1 | 2/2001 | Stilp | |
| 6,266,013 B1 | 7/2001 | Stilp et al. | |
| 6,564,036 B1* | 5/2003 | Kasapi | 455/1 |
| 6,782,264 B2 | 8/2004 | Anderson | |
| 7,667,649 B2 | 2/2010 | LeFever et al. | |
| 7,783,299 B2 | 8/2010 | Anderson et al. | |
| 7,797,000 B2 | 9/2010 | Anderson | |
| 7,929,487 B2* | 4/2011 | Van Wijngaarden et al. | 370/328 |
| 2002/0101375 A1 | 8/2002 | Stilp et al. | |
| 2004/0102196 A1* | 5/2004 | Weckstrom et al. | 455/456.1 |
| 2004/0166876 A1* | 8/2004 | Moilanen | 455/456.1 |
| 2005/0014516 A1* | 1/2005 | Rached et al. | 455/456.1 |
| 2005/0054368 A1* | 3/2005 | Amerga | 455/525 |
| 2009/0143018 A1* | 6/2009 | Anderson et al. | 455/67.11 |
| 2010/0087204 A1 | 4/2010 | Islam et al. | |
| 2010/0177740 A1* | 7/2010 | Lim et al. | 370/335 |
| 2010/0234045 A1 | 9/2010 | Karr et al. | |

OTHER PUBLICATIONS

International Patent Application No. PCT/US11/63250: International Search Report and Written Opinion dated Mar. 2, 2012, 11 pages.
U.S. Appl. No. 11/736,902, filed Apr. 18, 2007, Mia.
U.S. Appl. No. 11/948,244, filed Nov. 30, 2007, Anderson.
U.S. Appl. No. 11/956,193, filed Dec. 13, 2007, Mia.
$3^{rd}$ Generation Partnership Project (3GPP), TS 25.201, V9.0.0, $3^{rd}$ Generation Partnership Project; Technical Specification Group Radio Access Network; "Physical layer on the radio path; General description" (Release 9), Sep. 2009, 15 pages.

(Continued)

*Primary Examiner* — Rafael Pérez-Gutiérrez
*Assistant Examiner* — Suhail Khan
(74) *Attorney, Agent, or Firm* — Woodcock Washburn LLP

(57) ABSTRACT

A wireless location system is configured to operate in a CDMA-based wireless communication network. In exemplary embodiments, location measuring units (LMUs) can synchronize to sectors of base stations and store sector timing information. In response to a request to geo-locate a mobile device communicating with a sector, sector timing information for the servicing sector is sent to other LMUs and the LMUs can use the sector timing information to detect uplink signals transmitted by the mobile device. The location of the mobile device can then be estimated based on time of arrival measurements made by the LMUs.

36 Claims, 9 Drawing Sheets

OTHER PUBLICATIONS

3rd Generation Partnership Project (3GPP), TS 25.211, V9.2.0, 3rd Generation Partnership Project; Technical Specification Group Access Network, "Physical channels and mapping of transport channels onto physical channels (FDD)", Sep. 2010, 58 pages.

3rd Generation Partnership Project (3GPP), TS 25.213, V9.2.0, 3rd Generation Partnership Project; Technical Specification Radio Access Network; "Spreading and modulation (FDD)" (Release 9), Sep. 2010, 38 pages.

3rd Generation Partnership Project (3GPP), TS 25.420, V9.1.0, 3rd Generation Partnership Project; Technical Specification Group Radio Access Network "UTRAN Iur interface: General Aspects and Principles", (Release 9), Sep. 2010, 24 pages.

3rd Generation Partnership Project (3GPP), TS 25.430, V9.0.0, 3rd Generation Partnership Project; Technical Specification Group Radio Access Network "UTRAN Iub interface; general aspects and principles", (Release 9), Dec. 2009, 26 pages.

3rd Generation Partnership Project (3GPP), TS 25.450, V9.0.0, 3rd Generation Partnership Project; Technical Specification Group Radio Access Network "UTRAN Iupc interface general aspects and principles", (Release 9), Dec. 2009, 12 pages.

3rd Generation Partnership Project (3GPP), TS 45.001, V9.3.0, 3rd Generation Partnership Project; Technical Specification Group GSM/EDGE Radio Access Network,; "Physical layer on the radio path; General description", (Release 9), Sep. 2010, 44 pages.

* cited by examiner

ROBUST DOWNLINK FRAME SYNCHRONIZATION SCHEMES IN CDMA WIRELESS NETWORKS FOR GEO-LOCATION

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to a method for using the wireless communications network (WCN) downlink radio broadcasts to determine frame and time slot for use a network-based wireless location system (WLS).

BACKGROUND

First commercially deployed in 1998, network-based wireless location systems (WLS) have been widely deployed in support of location-based services including emergency services location. These network-based wireless location systems collect uplink radio transmissions from a mobile device and then use Time-difference-of-arrival (TDOA), angle of arrival (AoA), and/or signal strength measurement to calculate the location of a mobile device, also known as a Mobile Station (MS), a handset, User Equipment (UE), etc. Network-based systems can also form part of a network-based with mobile-based hybrid location technology.

Network-based WLS normally rely on geographically distributed receivers nominally co-located with the wireless communications network (WCN) base stations to share the receiving antenna, filters, low impedance cabling, and low-noise amplifiers already in use in the base station. The WLS receivers (also called Signal Collection Systems (SCS), Position Determining Equipment (PDE), or Location Measurement Unit (LMU)).

Early work relating to the field of network-based Wireless Location has been described in U.S. Pat. No. 4,728,959; "Direction finding localization system" and U.S. Pat. Nos. 5,327,144; "Cellular Telephone Location System", and U.S. Pat. No. 5,608,410; "System for Locating a Source of Bursty Transmissions". These patents are commonly assigned to TruePosition Inc. and are herein incorporated by reference in their entirety.

Code Division Multiple Access (CDMA) is a now common method for transmission of voice and data over radio. TruePosition was a pioneer in location of CDMA mobiles. Location techniques specific to wideband communications system are taught in U.S. Pat. No. 6,047,192; "Robust, Efficient, Localization System". Location techniques specific to Code Division Multiple Access (CDMA) wireless systems was previously taught in U.S. Pat. No. 7,667,649; "Detection of time of arrival of CDMA signals in a wireless location system".

Exemplary techniques using downlink receivers in a network-based WLS are taught in TruePosition patent application Ser. No. 11/736,902, filed on Apr. 18, 2007, entitled "Sparsed U-TDOA Wireless Location Networks" and U.S. patent application Ser. No. 11/948,244, filed on Nov. 30, 2007, entitled "Automated Configuration of a Wireless Location System.

The inventive techniques and concepts described herein can be applied to code-division radio communications systems such as CDMAOne (IS-95), CDMA2000 (IS-2000) and the Universal Mobile Telecommunications System (UMTS), the latter of which is also known as W-CDMA. The UMTS model used herein is an exemplary but not exclusive environment in which the present invention may be used.

SUMMARY

The following summary provides an overview of various aspects of exemplary implementations of the invention. This summary is not intended to provide an exhaustive description of all of the important aspects of the invention or to define the scope of the invention. Rather, this summary is intended to serve as an introduction to the following description of illustrative embodiments.

In an exemplary embodiment of the invention, a wireless location system is configured to operate in a CDMA-based wireless communications network. Reception of a CDMA downlink signal allows the mobile device to synchronize with the radio access network. By synchronizing with a downlink signal, e.g., a pilot channel, a beacon signal, or any other CDMA/UMTS downlink signal, a location measuring unit can obtain sector timing information, i.e., sector timing offsets, and can supply the sector timing offsets to the other local LMUs, thereby decreasing the time and complexity of synchronization during a signal collection for location computation.

For example, a first LMU can obtain sector timing information associated with the cell/sector servicing a mobile device and send the sector timing information to one or more additional LMUs. The LMUs can receive the sector timing information and use it to determine Time-difference-of-arrival (TDOA) and/or angle of arrival (AoA) information and send it to a serving mobile location center, which can determine the location of the mobile device.

In the same or another exemplary embodiment, a LMU can use an array of adaptively weighted antennas to cancel downlink signals transmitted by a first sector of a base station in order to detect downlink signals, e.g., a pilot channel, transmitted by a second sector of the base station. In this exemplary embodiment of the invention, the weight coefficients at each antenna of the array can be adjusted in amplitude and phase before they are combined. Thereafter, the array can detect a downlink signal transmitted by the second sector and the LMU can synchronize to it.

In the same or another exemplary embodiment of the invention, each LMU can be associated with a group of downlink antennas (or arrays of adaptively weighted antennas). Each downlink antenna (or array) can be placed at different locations relative to the LMU. A radio frequency (RF) switch can be used to select an antenna (or array) that can detect downlink signals from a sector of interest. The LMU can then synchronize with the sector.

In yet another exemplary embodiment of the invention, a LMU can be associated with a directional antenna (or arrays of adaptively weighted directional antennas). In this example embodiment, a directional antenna (or array) can be aimed at a downlink transmission antenna of a base station in order to detect downlink signals from a sector of interest. The LMU can then synchronize with the sector. In this exemplary embodiment, the LMU may not be co-located with the base station.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION OF ILLUSTRATIVE EMBODIMENTS

Figure 1:
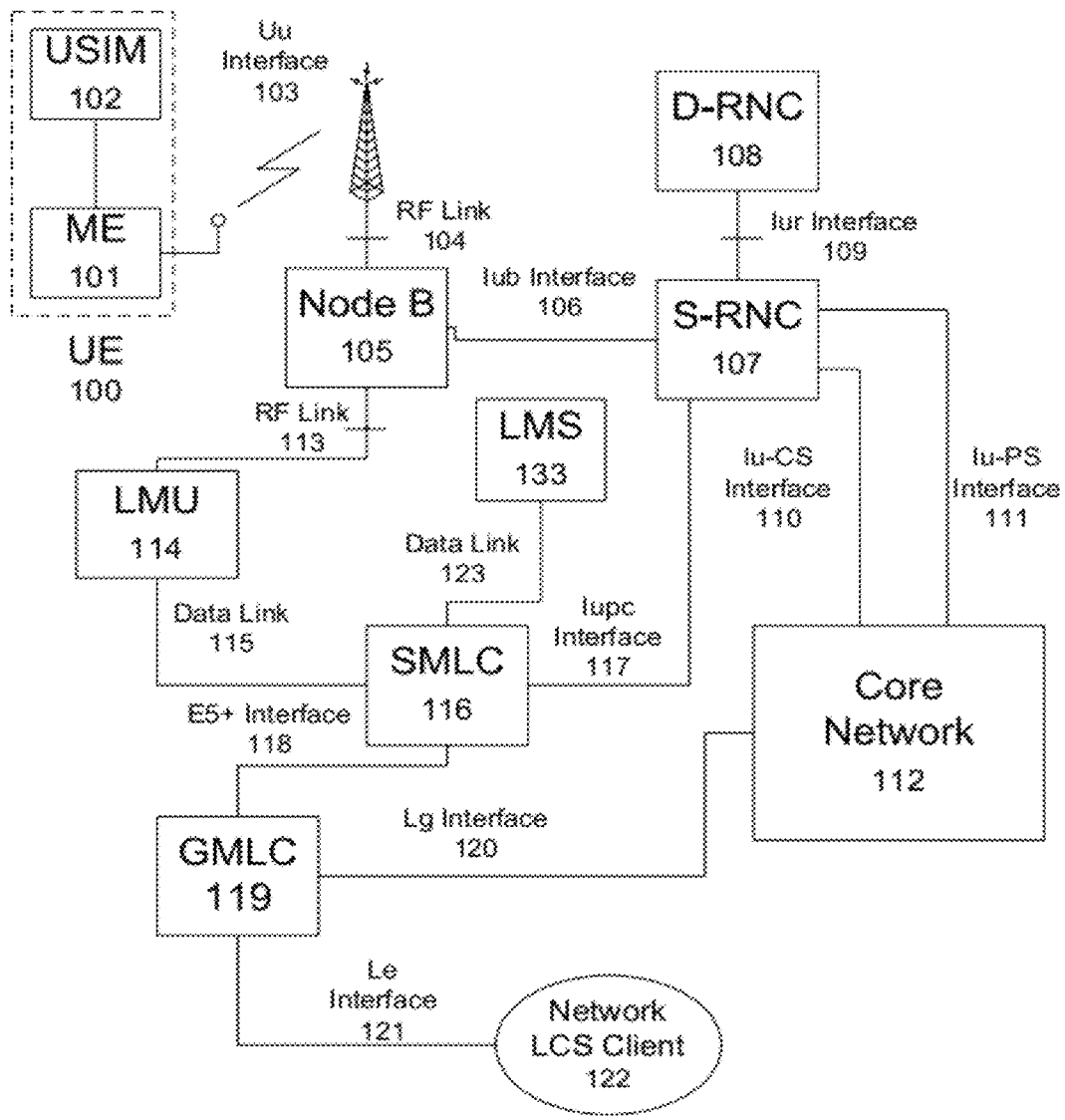
FIG. 1 schematically depicts a UMTS network with ancillary Wireless Location System.

We will now describe illustrative embodiments of the present invention. First, we provide a detailed overview of the problem and then a more detailed description of our solutions. Generally, in a CDMA-based wireless communications network, the downlink beacons (also known as pilots) may be used by the LMU to develop synchronization needed to receive uplink signals. A network-based wireless location system (WLS), using Time-difference-of arrival (TDOA), i.e., uplink-time-difference-of-arrival (UTDOA), and/or Angle-of-Arrival (AoA) as a primary means or as part of a secondary combinational hybrid location technique, must be able to receive the uplink signal(s) broadcast by the mobile device. In addition to the tasking data set by the triggering platform (e.g. radio frequency, code channel) the LMU receivers must have the ability to determine sector timing information, e.g., frame and slot timing offsets and/or the frame number. Since this information may not be provided by the wireless network, in an exemplary embodiment of the invention, a LMU can be configured to derive the sector timing information for each sector of a cell, e.g., a Node B, and store it. In the instance that a request is received to locate a mobile device communicating with a sector of the cell, the LMU can provide the sector timing information to other LMUs, which can use the information to detect uplink signals broadcast by the mobile device.

Geo-location of Code Division Multiple Access (CDMA) wireless signals with UTDOA requires a replica of the signal from the mobile to be geo-located. The uplink signal broadcast by the mobile device can be received at the serving cell/sector with the LMU; however, it is corrupted by many other CDMA signals that are on the same channel. Thus, it is necessary to be able to separate the desired mobile's signal from all of the others received on that channel so that the required replica can be reconstructed. Separating the mobile's signal from others on the channel can be accomplished by despreading and demodulating the uplink signal to recover the information bits, which then can be used to later reconstruct the signal.

Despreading a CDMA signal requires knowledge of the spreading codes as well as their timing with respect to the cell/sector's clock. The spreading codes for the mobile-of-interest are generally known via the WLS tasking information, delivered by the triggering platform, but sector timing information is usually not.

Once the information bits have been recovered the signal may be reconstructed. The reconstructed signal represents the replica that is required for UTDOA geo-location. The ability of the WLS to detect and demodulate cell downlink beacons to determine cell timing allows for easier detection and demodulation of the uplink signals required for geo-location since synchronization does not need to be preformed on a per-location basis nor does synchronization need to be performed when a location request is received. Rather, synchronization can be performed at some point prior to receipt of the location request.

Synchronization via downlink transmissions from base stations, e.g., Node Bs, has the following advantages:

The Node B signals are strong, i.e., the signals possess high signal-to-noise ratios (SNR) because the LMU is close to the Node B.

The same technique that the mobile devices (User Equipment—"UEs" in UMTS) in the network use to synchronize to the serving Node B, which is proven and well known, can also be used by the LMU to synchronize to the Node B.

The time offset between the Node B and UE is small, which permits determining an efficient time search window for receiving and demodulating the uplink signals. This minimizes false alarms and signal processing in the geo-location process.

Synchronization of a LMU to all of the sectors of a Node B only has to be done once and does not have to be done in real-time, which minimizes the processing power required of the LMU.

The disadvantages of configuring the LMUs to synchronize via downlink transmissions from Node Bs are:

Additional RF hardware needs to be installed in the LMU for tuning to and receiving the downlink transmissions of the Node B in a UMTS network. In dual mode GSM/UMTS networks, downlink receivers may already be deployed for GSM, mitigating this factor.

The power level of the downlink signal from one or more sectors of the Node B may be much greater at the downlink antenna location than downlink signals from other sectors of the Node B. This could prevent the reception of and synchronization to these other sectors.

With a one-to-one deployment of LMUs to cell sites, only a single LMU is required to develop sector timing information, e.g., slot reference time information and frame reference time information for each cell or cell/sector. Although in a CDMA-based WCN, the mobile device may be in communication with multiple sites during a voice call or data session, only one cell or sector provides the timing reference, thus the concept of serving cell exists even in soft-handoff capable, spread spectrum systems such as CDMA2000 and UMTS. Since WLS deployments are not co-incident with WCN deployments and may span cross-network or cross service area boundaries, the ability to determine individual sector timing for synchronization is valuable in both the synchronous CDMAOne/CDMA2000 and the asynchronous UMTS networks.

FIG. 1

FIG. 1 illustrates an exemplary soft-handoff capable, spread spectrum UMTS system, also known as the Wideband CDMA (W-CDMA) or UMTS Terrestrial Radio Access Network (UTRAN) system, which can be used as an example radio access network reference model for practicing the present invention.

Referring to the upper left hand portion of FIG. 1, it shows the UMTS UE (User Equipment) 100, which is the logical combination of the ME (Mobile Equipment) 101 and SIM/USIM (Subscriber Identity Module/UMTS Subscriber Identity Module) 102. The UE is the formal name for the UMTS handset or mobile device.

The Mobile Equipment (ME) 101 is the hardware element of a mobile station and comprises of keyboard, screen, radio, circuit boards and processors. The ME processors support both communications signal processing and processing of various UE-based services that may include a UE-based LCS Client application.

The USIM (UMTS Subscriber Identity Module) 102, also referred to as a SIM card, is a programmable memory device what holds the user subscription information to the UMTS mobile network. The USIM contains relevant information that enables access onto the subscribed operator's network and to UE-based services that may include a UE-based LCS Client application.

The Node B 105 is the function within the UMTS network that provides the physical radio link between the UE 100 (User Equipment) and the land-side network. Along with the transmission and reception of data across the radio interface, the Node B also applies the codes that are necessary to describe channels in a W-CDMA system. The Node B supplies timing information to UEs 100 over the Uu 105 interface. The Node B access the Uu interface via wired antenna feeds 104.

The UTRAN (UMTS Terrestrial Radio Access Network) comprises one or more RNSs (Radio Network Subsystems). Each RNS comprises one or more RNCs (Radio Network Controllers) and their supported Node B's 105. Each RNS control the allocation and the release of specific radio resources to establish a connection between a UE 100 and the UTRAN. A RNS is responsible for the resources and transmission/reception in a group of cells.

When a RNC has a logical RRC (Radio Resource Control) connection with a UE (User Equipment 100) via the Node B 105, it is known as the S-RNC 107 for that UE 100. The S-RNC (servicing-RNC) 107 is responsible for the users mobility within the UTRAN network and is also the point of connection towards the CN (Core Network) 112. The S-RNC 107 connects to the Node B via the 3GPP standardized Iub interface 106.

When a UE 100 in the connected state is handed onto a cell associated with a different RNC it is said to have drifted, i.e., drifted to D-RNC 108. The RRC connection however still terminates with the S-RNC 107. In effect the D-RNC 108 acts as a switch, routing information between the S-RNC 107 and the UE 100.

The C-RNC (Controlling Radio Network Controller) is the RNC responsible for the configuration of a Node B. A UE 100 accessing the system will send an access to a Node B, which in turn will forward this message onto its C-RNC. The C-RNC is nominally the S-RNC 107.

The Core Network 112 provides the functions of mobility management, exchange services for call connection control signaling between the user equipment (UE) and external networks, and interworking functions between the UTRAN radio access network and external packet and switched circuit networks. The Core Network 112 also provides billing functionality, security and access control management with external networks.

The LMU 114 (Location Measurement Unit) makes radio measurements to support positioning of UE 100. The LMU 114 may be an overlay addition to the UMTS network or may be integrated into the hardware and software of the Node B. In the present invention, the LMU 114 receives the Um radio interface for development of TDOA and/or TDOA/AoA calculated location and velocity estimates. The LMU 114 connects to cell site antenna or to the Node B via a radio coupler to the antenna feed 113.

Examples of a U-TDOA and U-TDOA/AOA LMU have been previously described in U.S. Pat. No. 6,184,829 entitled "Calibration for a Wireless Location System;" U.S. Pat. No. 6,266,013 entitled "Architecture for a Signal Collection System in a Wireless Location System; and U.S. Pat. No. 6,108,555 entitled "Enhanced Time Difference Localization System," each of which is assigned to TruePosition and incorporated by reference in its entirety.

Turning back to the description of FIG. 1, the SMLC (Serving Mobile Location Center) 116 is a logical functional entity implemented either a separate network element (or distributed cluster of elements) or integrated functionality in the S-RNC 107. The SMLC 116 contains the functionality required to support Location Based Services. The SMLC 116 is the logical entity that provides the bridge between the wireless network and the location network (LMU 114, SMLC 116, and GMLC 119) by possessing data concerning the geographical area as well as the radio network topology. The SMLC 116 manages the overall co-ordination and scheduling of LMU 114 resources required for the location of a mobile. It also calculates the final location, velocity, and altitude estimates and estimates the achieved accuracy for each. In the present invention, the SMLC 116 controls and interconnects a set of LMUs via packet data connections 115 for the purpose of obtaining radio interface measurements to locate or help locate UE 100 in the geographical area that its LMUs serve. The SMLC 116 contains U-TDOA, AoA and multipath mitigation algorithms for computing location, confidence interval, speed, altitude, and direction of travel. For example, the U-TDOA, AoA, and multipath migration algorithms may be integrated into a program that executes on a processor. The SMLC 116 can also determine which wireless phones to locate based upon triggering from the Link Monitoring System (LMS) 124 or requests from the 3GPP standardized Iupc interface 117 to an infrastructure vendor's Radio Network Controller (RNC) Station Controller 107.

The Gateway Mobile Location Center (GMLC) 119 is defined by 3GPP standards as the clearinghouse for location records in a GSM/GPRS/UMTS network. The GMLC 119 serves as a buffer between the tightly controlled SS7 network (the GSM-MAP and CAP networks) and the insecure packet data networks such as the Internet. Authentication, access control, accounting, and authorization functions for location-based services are commonly resident on or controlled by the GMLC 119. A GMLC 119 is a server that contains the functionality required to support LBS services as well the interworking, access control, authentication, subscriber profiles, security, administration, and accounting/billing functions. The GMLC 119 also has the ability to access the GSM-MAP and CAP networks to discover subscriber identity, request and receive routing information, obtain low-accuracy UE location, and to exert call control based on UE location. In any UMTS network, there may be multiple GMLCs.

A Network LCS Client 122 is the logical functional entity that makes a request to the PLMN LCS server for the location information of one or more than one target UEs. In the UMTS network depicted in FIG. 1, the LCS server is implemented as software and data on the GMLC 119 platform. This inclusion of the LCS server with the GMLC 119 is typical for deployed systems. An LCS server comprises a number of location service components and bearers needed to serve the LCS clients. The LCS server shall provide a platform which will enable the support of location based services in parallel to other telecommunication services such as speech, data, messaging, other teleservices, user applications and supplementary services. The Network LCS client uses the Le interface 121 to access the GMLC. The network LCS client can communicate with the GMLC-based LCS server 119 to request the immediate, periodic or deferred location information for one or more target UEs within a specified set of location-related quality of service parameters if allowed by the security and privacy protections provided by the GMLC-based LCS server 119.

The Mobile LCS Client (not shown) is a software application residing in the ME 101 of the UE 100 using the USIM 102 for non-volatile or portable data storage. The mobile LCS Client may obtain location information via the GMLC 119 using the Le Interface 121 over a wireless data connection.

The non-standard, optional LMS 133 provides passive monitoring of UMTS network interfaces such as the Iub, Iur, Iu-CS and Iu-PS by means of passive probes (not pictured) reporting to a central server or server cluster. By monitoring these interfaces, the LMS 133 may develop tasking and triggering information allowing the SMLC 116 to provide autonomous, low-latency location estimates for pre-provisioned LBS applications. The LMS 133 developed triggering and tasking information is delivered to the SMLC 116 via a generic data connection 123, normally TCP/IP based. The LMS 133 is a modification to the Abis Monitoring System (AMS) described in U.S. Pat. No. 6,782,264 entitled "Monitoring of Call Information in a Wireless Location System" and expanded in more detail in U.S. Pat. No. 7,783,299 entitled "Advanced Triggers for Location Based Service Applications in a Wireless Location System," both of which are hereby incorporated by reference in their entirety. The LMS 133 may be incorporated as software into the Node B 105 or RNC 107, 108 nodes of the UMTS system or deployed as an overlay network of passive probes.

The Uu interface 103 is the UMTS Air Interface as defined by 3GPP. This radio interface between the UTRAN and the UE 100 utilizes W-CDMA and either Frequency Division Duplexing (FDD) or Time Division Duplexing (TDD). The UMTS radio interface is well described in 3GPP technical specifications 25.201 and 45.201 both entitled; "Physical layer on the radio path; General description." Specifics of the Uu radio interface as implemented in an FDD W-CDMA radio system are described in 3GPP Technical Specification 25.213 entitled "Spreading and modulation (FDD)." Details and descriptions of the physical and logical channels used in a FDD W-CDMA UMTS are located in 3GPP Technical Specification 25.211 entitled "Physical channels and mapping of transport channels onto physical channels (FDD)."

The Iub interface 106 is located in a UMTS radio network and is found between the RNC and the NodeB 105. The Iub interface is as defined in 3GPP TS 25.430 entitled "UTRAN Iub Interface: general aspects and principles."

The Iur 109 interconnects the UMTS Server or core RNC 70 with the Drift RNC 108 in the UMTS network. The Iur interface is standardized in 3GPP Technical Specification 25.420 entitled "UTRAN Iur Interface: General Aspects and Principles."

The Iu-CS (Circuit Switched) interface 110 connects the UMTS RNC with the circuit switched communications oriented portion of the Core Network 112.

The Iu-PS (Packet Switched) interface 111 connects the UMTS RNC with the packet switched communications oriented portion of the Core Network 112.

The Iupc 117 interconnects the UMTS RNC with the SMLC (also called the SAS) in the UMTS network for location estimation generation. The Iupc interface is introduced in 3GPP Technical Specification 25.450 entitled "UTRAN Iupc interface general aspects and principles."

The E5+ interface 118 is a modification of the E5 interface defined in the Joint ANSI/ETSI Standard 036 for North American E9-1-1. The E5+ interface 118 connects the SMLC 116 and GMLC 119 nodes directly, allowing for push operations when the LMS 133 triggers are used by the wireless location system with either network acquired information (cell-ID, NMR, TA, etc) or via TDOA and/or AoA (angle of arrival) performed by the LMU's 114 specialized receivers.

The Le interface 121 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 122 is also known as a LCS (Location Services). The LBS and LCS services resident on the LCS Client 122 are software applications, data stores, and services uniquely enabled to use the location of a mobile device.

FIG. 2

Figure 2:
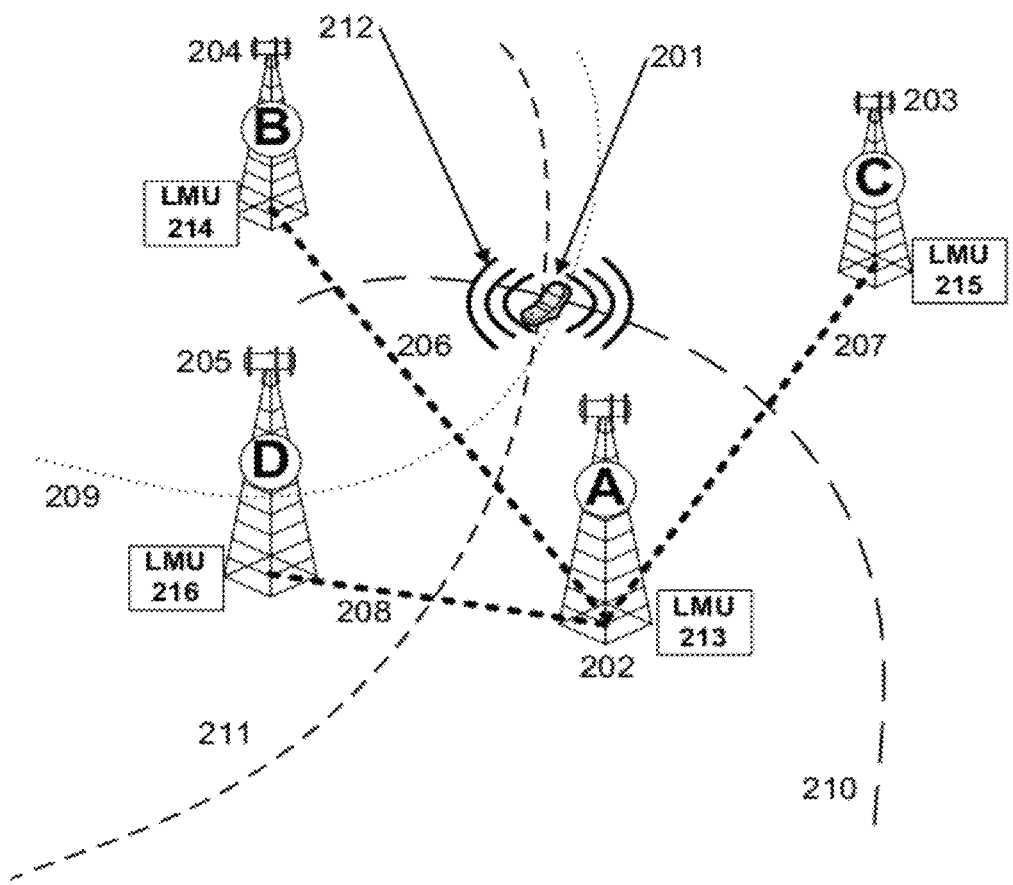
FIG. 2 illustrates the concept of baseline correlation for location.

FIG. 2 illustrates a high-level overview of a system configured to geo-locate a mobile device 201, which could be the UE 100 of FIG. 1. Geo-location of Code Division Multiple Access (CDMA) wireless signals with UTDOA requires a replica of the signal from the mobile to be geolocated. This technique is deemed the baseline correlation method as originally defined in U.S. Pat. No. 5,327,144 entitled "Cellular telephone location system" and described in more detail in U.S. Pat. No. 5,608,410 entitled "System for locating a source of bursty transmissions cross reference to related applications." Modifications for wideband communications networks to the basic baseline correlation method are taught in U.S. Pat. No. 6,047,192 entitled "Robust, Efficient, Localization System." FIG. 2 geographically illustrates a time-difference-of-arrival location estimate using the baseline correlation method. According to this example, all cell towers, e.g., Node Bs (202, 203, 204, and 205) are shown as omnidirectional or single sectored only purpose of brevity and other configurations can be used. For example, each Node B could include multiple sectors. Briefly, a sector is cell that only covers a part of the area around a base station. Each sector in a CDMA system can be associated with its own PICH (pilot channel.) A typical configuration is called a trisector, in which there are three sectors, each one served by separate antennas. Every sector has a separate direction of tracking of 120° with respect to the adjacent ones. An LMU (213, 214, 215, and 216) is shown co-located with each cell tower (202, 203, 204, and 205.)

An operational procedure for geo-locating a mobile device 201 can begin with the mobile device transmitting an uplink signal 212 to cell tower 202. The LMUs (213, 214, 215, and 216) co-located in this example with the cell towers "A" 202, "B" 203, "C" 204, and "D" 205 are tasked to collect the uplink signal 212 based on information received from the triggering platform. In this example, the LMUs (213, 214, 215, and 216) can be synchronized with the uplink signal 212 using tasking information provided by the LMS 133 and sector timing information that could have been previously generated by LMU 213, which is co-located with the serving cell tower 202. The LMU 213 co-located in cell site "A" 202 is found to have the best received signal quality of the uplink signal 212 and is selected as the reference. Even though the mobile transmission 212 is corrupted by many other CDMA signals that are on the same channel, the LMU 213 can separate the uplink signal 212 from all of the others received on that channel. Separation can be accomplished by using the sector timing information to despread the CDMA signals on the same channel and demodulate the uplink signal 212 to recover the information bits. Once the information bits have been recovered, the uplink signal 212 may be reconstructed into the reference, which is distributed to the other receiving LMUs 214, 215, and 216. Similarly, each tasked LMU can use the sector timing information to despread the CDMA signals on the same channel and demodulate them to collect samples of uplink signal 212.

The reference and the collected samples of the uplink signal 212 from each tasked LMU (213, 214, 215, and 216) are then correlated and hyperbolas (209, 210, and 211) can be formed for each baseline (206, 207, and 208). The intersection of the hyperbolas (209, 210, and 211) is then reported as the location of the mobile device 201.

Using the baseline correlation method, the reconstructed signal represents the replica signal that is required for UTDOA geo-location. Despreading a CDMA signal requires knowledge of the spreading codes as well as their timing with respect to the cell/sector's clock. The spreading codes for the mobile-of-interest are generally known via the tasking information, but the sector timing information for the serving sector is usually not. Signal processing techniques may be utilized to determine this timing, but they are computationally expensive (as described in U.S. patent application Ser. No. 11/956,193; "Mid-Call Synchronization for U-TDOA and AOA Location in UMTS," the contents of which is herein incorporated by reference.) Therefore, it would be useful, and efficient, if the LMU were time synchronized to the cell sector since this would only require the use of signal processing to achieve time synchronization once.

FIG. 3

Figure 3:
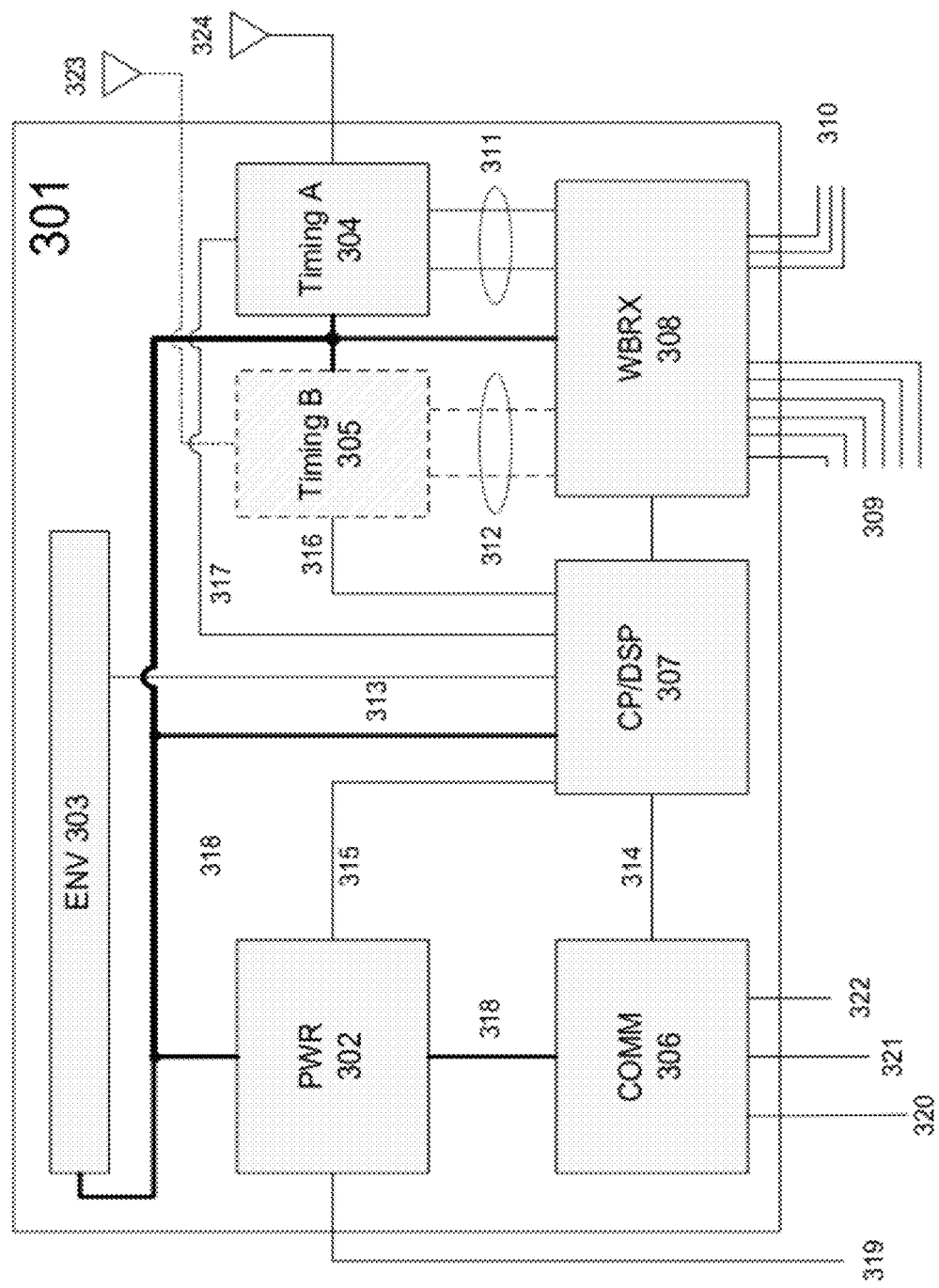
FIG. 3 shows the subsystems of an exemplary LMU used in U-TDOA or U-TDOA hybrid wireless location systems.

Turning now to FIG. 3, schematically depicts the major functional subsystems and interconnections of an exemplary LMU used for U-TDOA, and U-TDOA hybrid locations according to embodiments of the invention. The LMU is itself a functional entity and may be combined into the software and circuitry of another device, such as the radio base station of a wireless communications network. Depicted here as a standalone device for the purposes of clarity, the LMU 301 contains a power (PWR) subsystem 302 that conditions input power 319 and then distributes power 318 and monitors the power conditions of the other subsystems.

The Power subsystem 302 communicates with the SMLC 116 and/or an Operations and Maintenance Center (OMC) (not shown) via packet connections 315 to the Communications (COMM) subsystem 306 via the CP/DSP 307 and the CP/DSP-to-COMM data link 314.

The LMU environmental subsystem 303 provides cooling as well as environmental and intrusion alarming via a data link 313 to the CP/DSP 307 and then to the Communications (COMM) subsystem 306 via the CP/DSP-to-COMM data link 314.

The primary Timing subsystem 304 uses broadcast radio signals collected by an antenna 324 to provide internal LMU timing and inter-LMU timing synchronization. A secondary, optional, timing subsystem 305 provides backup and holdover in case of a failure of the primary timing subsystem 304. The secondary timing subsystem is shown here as served by its own antenna 323. Timing signals are supplied via data connections 317 316 to the CP/DSP subsystem 307 and the via data connections 311 312 to the WBRX subsystem 308.

The LMU communications (COMM) subsystem 306 translates and physically bridges the communications links to the LMU. The currently deployed LMU model shown here provides duplex links for V.35 format 320, a T1/E1 format 321, and TCP/IP format 322.

The Central Processor/Digital Signal Processor (CP/DSP) subsystem 307 provides the TDOA (or TDOA/AoA) calculation processing as well as managing the operations of the LMU 301. The CP/DSP 307 communicates with the SMLC, OMC, or triggering platform via a packet connection 314 with Communications Subsystem 306. The CP/DSP 307 also monitors via a data connection 313 environmental indications and alarms from the environmental system 303.

The Wide Band Receiver (WBRX) 308 is a software-defined receiver (SDR) with input ports for both the uplink (receiver) antenna 309 but also ports for the downlink receiver antenna 310 used for monitoring of nearby cells for signal and timing. (See U.S. patent application Ser. No. 11/948,244 entitled "Automated Configuration of a Wireless Location System" for additional detail on the downlink monitoring capabilities of the LMU.) The WBRX 308 uses timing and frequency references supplied via a data connections 311 312 from the timing subsystem(s) 304 305 for tuning and accurate timestamping.

FIG. 4

Determining the location of subscribers in multi-user wireless communications networks with a passive overlay geo-location system typically requires the geo-location system to synchronize with the frame and slot timing of the sector serving the mobile device. In the exemplary UMTS radio access network, the basic unit of time is a 10 millisecond (ms) radio frame, which is divided into 15 slots of 2560 chips each. The frame number will vary from 0 to 4095 and therefore repeats every 40.96 seconds. Different sectors of a UMTS Node B will typically utilize a common frame and slot timing but with an offset of integer values of 256 chips.

Frame synchronization of an LMU to the sector(s) of a Node B can be accomplished by monitoring the downlink transmissions of the Node B in much the same way the UE 100 does during the initial cell selection procedure.

The LMU cell/sector synchronization procedure involves multiple steps. In an exemplary embodiment, the operational procedure used to synchronize to a sector can be implemented in a program and executed by a general purpose processing unit. Turning now to the operational procedure, first, as shown by operation 400, the LMU downlink receiver system is tasked to collect radio signals for synchronization and can detect a PICH (pilot channel). From the pilot channel for a sector, the LMU can determine the PN (Pseudo-random Noise) sequence used by the sector.

As shown by operation 401, next, the LMU can detect the downlink SCH (synchronization channel). Briefly, the SCH is a common downlink channel transmitted from the cell and allows for synchronization at the slot and frame levels and allows the LMU to determine the particular scrambling code group of the sector. As specified in technical specifications for the UMTS standards, the downlink synchronization channel (DL-SCH or just SCH) is a sparse downlink channel that is only active during the first 256 chips of each slot. The SCH is made up of two sub-channels, the Primary SCH (P-SCH) and the Secondary SCH (S-SCH). The P-SCH 256 chip sequence, or P-SCH code, is the same in all slots of the SCH for all cells. In contrast, the S-SCH 256 chip sequence, or S-SCH code, may be different in each of the 15 slots of a radio frame and is used to identify one of 64 possible scrambling code groups. In other words, each radio frame of the SCH repeats a scrambling code group sequence associated with the respective transmitting cell. Each S-SCH code is taken from an alphabet of 16 possible S-SCH codes. Returning back to the description of FIG. 4, the LMU, for each sector of the proximate or co-located Node B, receives the downlink P-SCH using the primary synchronization code. As shown by operation 402, the primary synchronization code is common to all cells and sectors in a UMTS radio access network to achieve synchronization to the slots of the Node B. In this regard, the P-SCH can be used to achieve slot synchronization. In a specific example, the LMU correlates received samples of the received P-SCH against the known P-SCH 256 chip sequence (which is the same for all slots) and, based on the location of the correlation peak, determines a slot reference time, as shown by operation 403. Once the slot reference time is determined, the LMU is slot synchronized and can determine when each slot starts in a received radio frame.

After slot synchronization, and turning to operation 404, the LMU receives the downlink S-SCH which permits determination of the code group for the sector which narrows the search of 512 scrambling codes to 8 scrambling codes. Reception of the S-SCH also indicates the frame boundaries although not the specific frame number. In particular, the LMU correlates the particular sequence of 15 S-SCH codes in a received radio frame against known sequences to determine frame boundaries 405 and the scrambling code group of the cell, as shown by operation s406-407.

Figure 4:
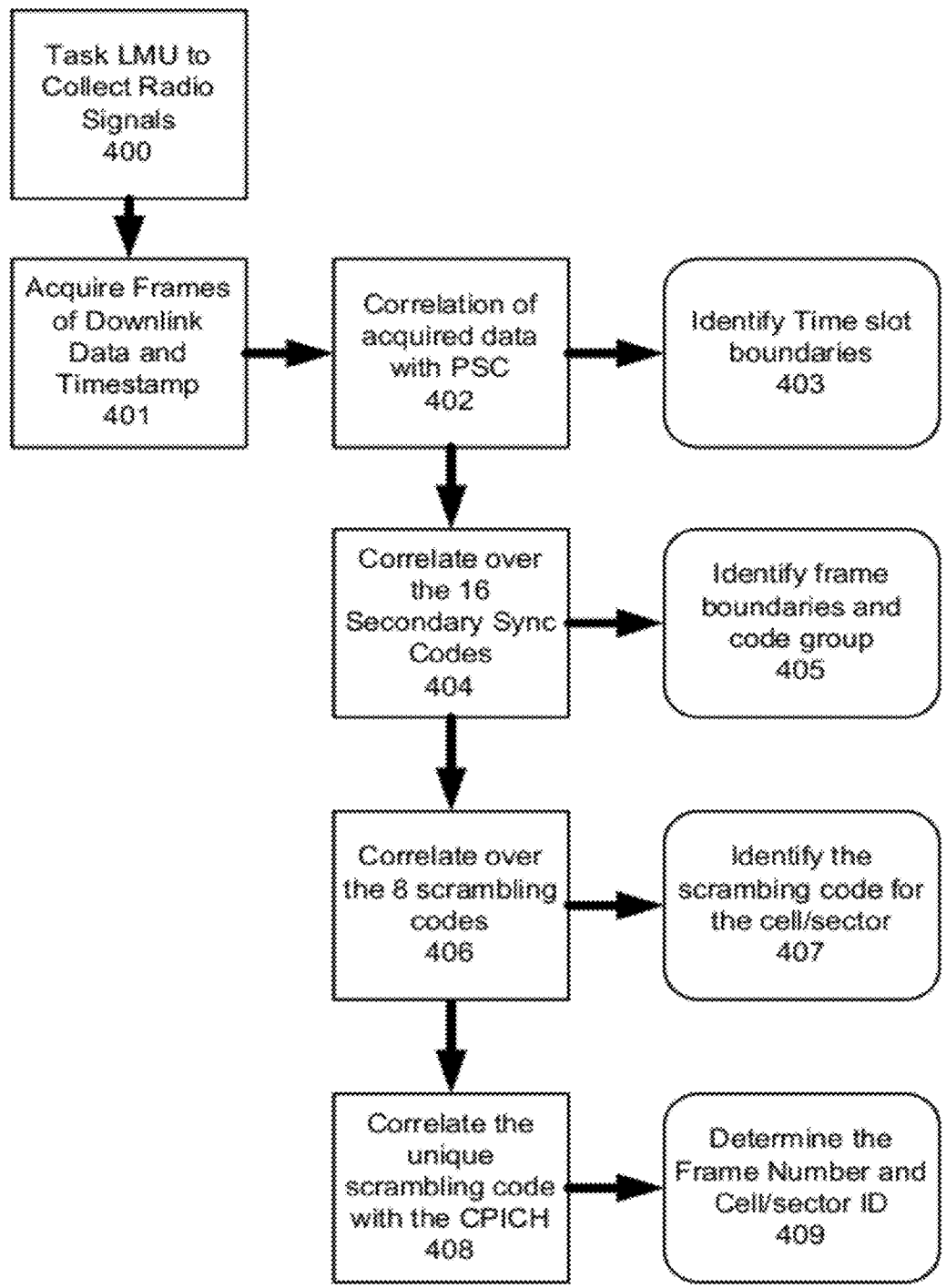
FIG. 4 illustrates an operational procedure for synchronizing to downlink signals.

Continuing with the description of FIG. 4, operation 408 shows that the LMU correlates the downlink C-PICH (Common Pilot Channel) with each of the 8 potential scrambling codes and operation 409 shows that the LMU then determines the correct scrambling code for the sector.

The LMU then can receive the BCH (broadcast channel) on the downlink P-CCPH (Primary Common Control Physical Channel) with the sector's scrambling code to determine the frame number and cell/sector identifier to achieve frame synchronization.

A LMU located at, or close to, the Node B can do the above procedure to achieve frame and slot synchronization with all of the sectors of the Node B provided the powers of the sectors' downlink signals at the LMU's downlink antenna terminals are well within $10 \log_{10}(256)$ dB. If the powers are not well within this dB range (24 dB in W-CDMA systems) then the higher power sectors will represent high power interference and will prevent the weaker sectors downlink signals from being received at a sufficient level to be processed for recovering the sector timing information.

Figure 5:
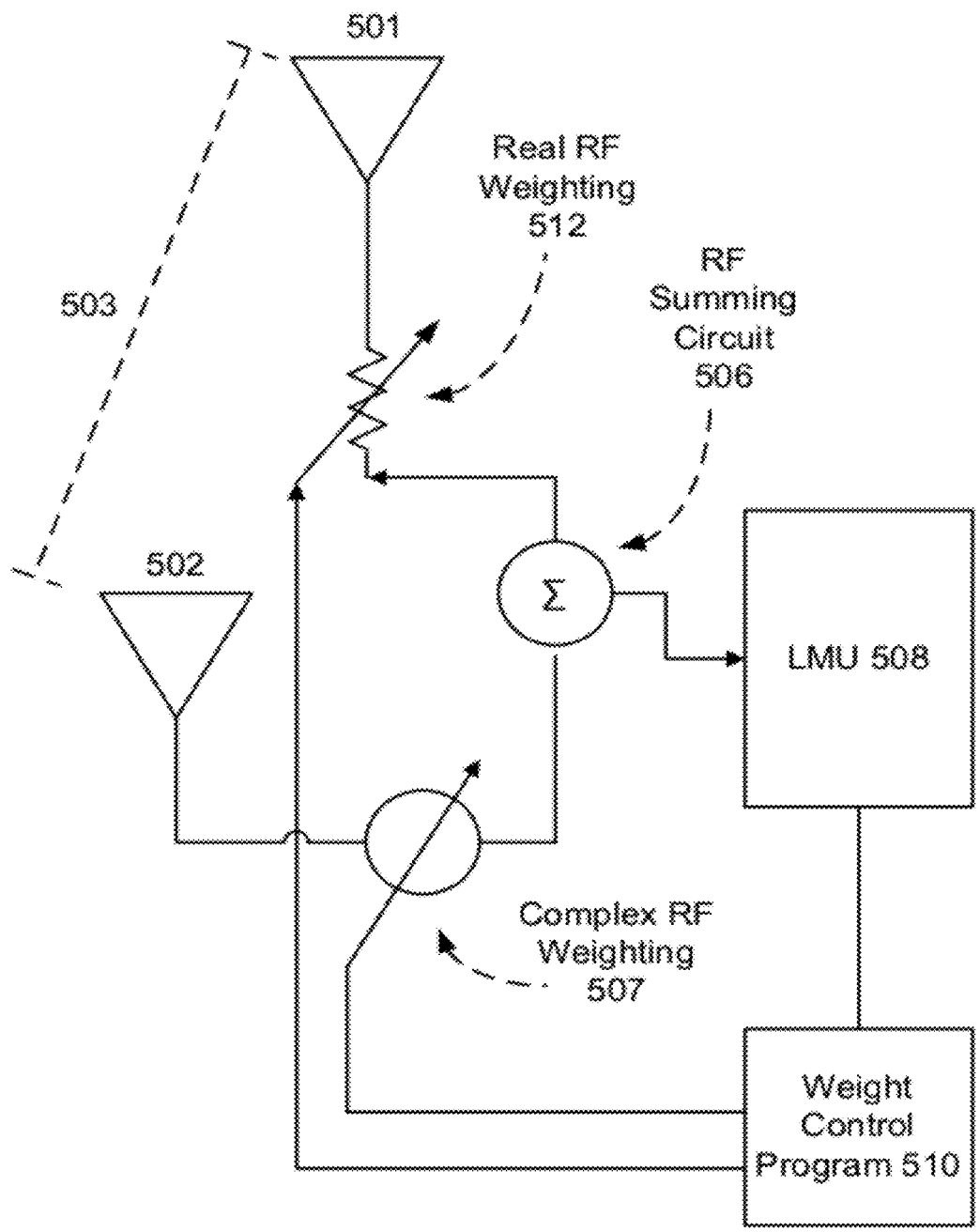
FIG. 5 depicts the subsystems of a spatial antenna interference cancellation downlink receiver system.

Specifically, the Eb/No (energy per bit to noise power spectral density ratio), which is a normalized signal-to-noise ratio measure of the C-PICH, will not be sufficient to synchronize with the sector. The physical location of the LMU's downlink antenna can be moved on the order of half of the operating wavelength and the relative powers of the sectors' downlink signals can change significantly. Generic Interference cancellation techniques can be used to remedy this situation but they typically require a priori information about the signals transmitted by the downlink sectors to be effective. FIG. 5

One approach that can be used to synchronize with a C-PICH channel is to utilize an array of antennas that are adaptively weighted and coherently combined. Such an array is illustrated in FIG. 5. All of the Node B's sectors' signals are incident at each of the antenna elements of the array. The power, i.e. amplitude, and phase of each sectors' signal at each of the antennas will be different depending upon:

The location and type of the antenna array elements.
The location and type of each sector antenna.
The power of each sector's transmitter.

The physical environment between the sector antennas and the antenna array elements.

The coefficients for the complex weights at each antenna array element will shift the signals incident upon each antenna array element in amplitude and phase before they are coherently combined in the summing junction. Typically, an algorithm can be used that will determine complex weight values for each element in the antenna array that will enhance the level of a specific sector's signal while reducing the levels of the remaining sectors' signals. Similarly, a set of complex weights can be determined that will enhance each sectors' signal while reducing the levels of the other sectors of the Node B. Thus, each sector of the Node B can be synchronized to with such an interference cancelling antenna array.

FIG. 5 shows a spatial interference canceller, i.e. an adaptive antenna array, comprised of a first downlink antenna 501 and a second first downlink antenna 502, a real RF weighting 512 on one antenna array, a complex RF weight 507 on the other of the antenna(s) and a RF summing junction 506 for combining the weighted radio signals for the downlink receiver. This practical embodiment of a two (or more) element interference cancelling antenna arrays that can be used to permit synchronization to all sectors of Node B in a sequential manner. One antenna element possesses a real weight, i.e. provides an amplitude adjustment only, while the other element possesses a complex weight, i.e. provides adjustment in both amplitude and phase.

The separation 503 of the two antennas (501 and 502) is typically on the order of one quarter to one half of a wavelength. The RF weighting, both real and complex, is controlled by a weight control program 510 being run either on a processor of the LMU 508 or another processor. The weight control program 510 could be to initially set the complex weight to zero and the real weight to one and measure the Eb/No of the C-PICH on as many sectors as possible where Eb/No is defined as the ratio of the RSCP (Received Signal Code Power), i.e., signal strength of the C-PICH, to the Received Signal Strength indication (RSSI), i.e., the total received power present in a pilot or beacon radio signal. If the RSCP can be received with sufficient Eb/No then frame and slot synchronization can be achieved for those sectors. The RF weight is then adjusted to null signals associated with strong RSCPs so the weaker ones can be heard and, therefore, frame and slot synchronization achieved for the weaker sector signals. Once frame and slot synchronization is achieved it only has to be checked periodically. Thus, the weight value required for each sector is noted and stored in a table, e.g., a data structure in memory.

The downlink receiver is a programmable unit since other algorithms exist and can be used as part of the described downlink receiver system as need arises. Additionally, the spatial interference cancellation downlink receiver system can be expanded with more downlink antennas and weightings as required.

Figure 6:
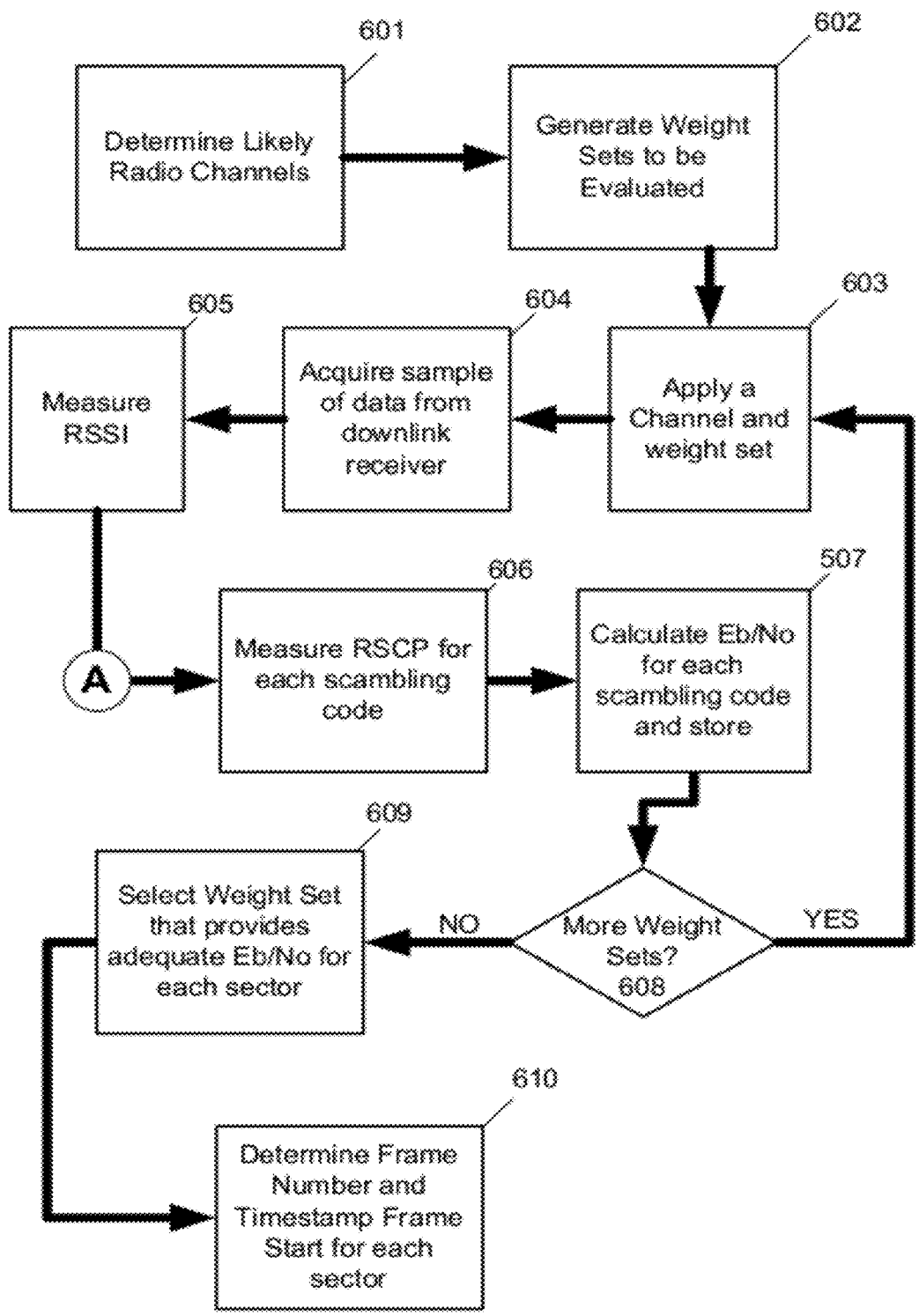
FIG. 6 shows an operational procedure for determining frame and slot timing offsets for each sector using an interference cancellation technique.

FIG. 6 illustrates a procedure for synchronizing to the sectors of a Node B with a priori knowledge of the scrambling code for each sector of the Node B.

The first step is to determine the sectors of interest to the LMU 601. This can be accomplished by file transfer, manual entry, or by scanning for beacons (see U.S. patent application Ser. No. 11/948,244 entitled "Automated Configuration of a Wireless Location System" and U.S. Pat. No. 7,797,000 entitled "System for Automatically Determining Cell Transmitter Parameters to Facilitate the Location of Wireless Devices" for methods to determine system parameters using the downlink receiver subsystem.) It is even possible that the WCN will deliver the sector of interest in the location request as part of the tasking information.

The second operation (operation 602) is to generate sets of weights that will be evaluated and put in a table. The next several operations, which can be executed by a processor of a computer system running weight control program 510, can be repeated until the sets of weights that have been put in the table are exhausted. As shown by operation 603, the first operation of the loop is to read the weights from the table and set them. Next, operation 604 shows that that adaptive array can acquire 20 milliseconds of data from the downlink channel of the Node B 604 via the LMU downlink receiver subsystem. Next, as shown by operation 605, the Received Signal Strength Indicator (RSSI) is calculated over this 20 ms set of data. The Received Signal Code Power (RSCP) of each C-PICH is then measured from this 20 ms data set for each sector of the Node B 506. From the RSSI and RSCP the ratio of Energy per Bit (Eb) to the Spectral Noise Density (No) is calculated. A check is made to see if this is the last weight set of the previously defined table 508. If sets are remaining, the for each remaining set, the weight set is applied and, as shown by operations 603-607, the procedure for radio signal collection, RSSI measurement, RSCP calculation, Eb/No calculation is repeated.

It is then a set of weights is selected that possess sufficient Eb/No to permit synchronization 509 to a sector. As shown by operation 610, these weights are applied to the interference cancelling antenna array and frame and time slot synchronization is achieved to each sector. In a specific example, the set of weights can be selected that maximizes the Eb/No of the downlink signal relative to the other sets of weights. For example, the Eb/No for each set of weights can be sorted and the highest set of weights can be selected.

FIG. 7

Figure 7:
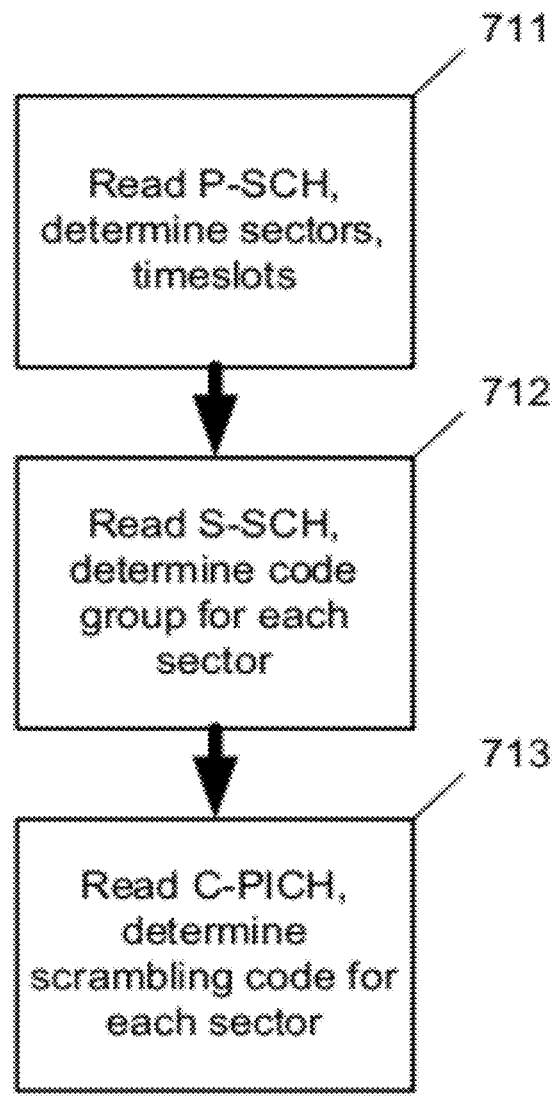
FIG. 7 shows alternative operations that can be executed with those illustrated by FIG. 6 to determine sector scrambling codes.

Often the scrambling codes of the Node B sector(s) will not be known a priori. This requires a few extra operations in the process illustrated by FIG. 6 as shown by the inclusion of the steps in FIG. 7 at the marker "A" in FIG. 6.

After determining the RSSI 605 for a beacon or pilot signal, operation 711 shows that the number of sectors and the time slot boundaries of each sector are determined from the P-SCH by LMU 508, e.g., a synchronization program running on LMU 508. Next, operation 712 shows that the code group for each sector is determined by correlating the S-SCH with the 16 possible Secondary Synchronization Codes (SSCs). Then, as shown by operation 713, the scrambling code group for each sector is determined by correlating the 8 scrambling codes of each sector's scrambling code group with the C-PICH to determine the unique scrambling code group for each sector. The remaining processing is the same as that with a priori knowledge of the scrambling code of each sector as shown in FIG. 6.

FIG. 8

Often UMTS Node Bs possesses more than one sector and, therefore, it is desired to synchronize to each of the sectors. Different sectors in UMTS Node Bs utilize common frame and slot timing but with an offset of integer values of 256 chips. If the signals from each of the sectors at the downlink antenna associated with the LMU are at the same approximate power, then synchronizing to each of the sectors is straightforward because the spreading factor for these signals is 256 which provides 10 log(256) or 24 dB of processing gain between the different scrambling codes of the different sectors.

Figure 8:
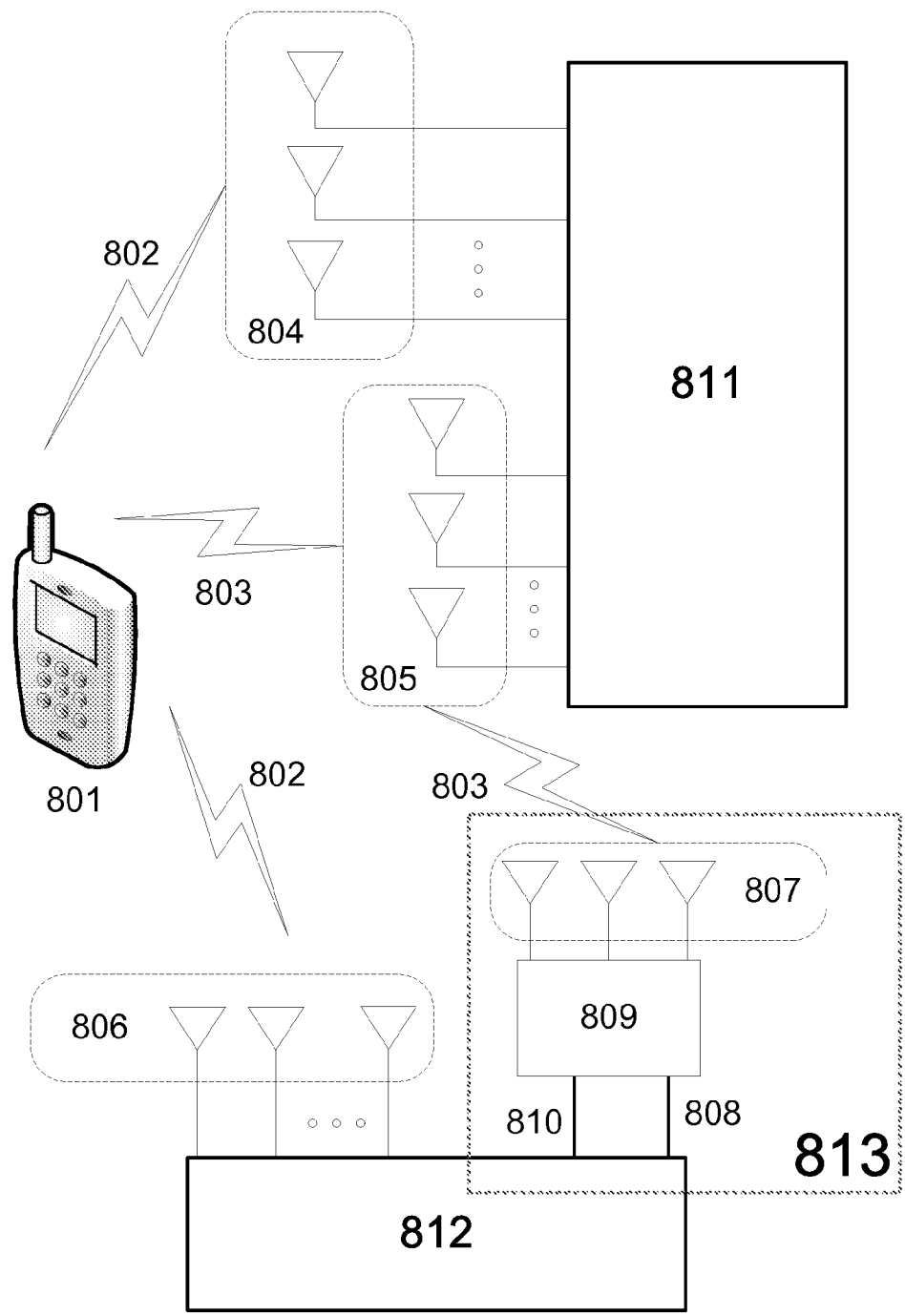
FIG. 8 depicts the subsystems of a switched antenna interference cancellation downlink receiver system.

However, if one of the sector's downlink signals is significantly stronger than the others at the downlink antenna then the sectors with the weaker signals will not be able to be received and synchronization with those sectors cannot occur. One remedy to this situation is to utilize several downlink antennas at different locations and a RF switch as shown in FIG. 8. The strength of each sector's downlink signal will vary with the position of the downlink antenna. The downlink antenna locations are selected such that each sector of the UMTS Node B can be reliably synchronized to.

As shown in FIG. 8 illustration, the mobile device 801 is in duplex radio communication with a base station 811 (e.g., a Node B in UMTS) via an uplink (mobile-to-base station) signal 802 and a downlink (base station-to-mobile) signal 803. The base station 811 has multiple uplink receiver antenna 804 and at least one downlink transmission antenna 805 per sector.

The LMU 812 has multiple receiver antenna 806 dedicated to receiving the uplink radio signal 802 from the mobile device. The downlink receiver subsystem 813 is used to receive the downlink signal 803 from the base station 811. Using multiple receive antenna 807, the downlink receiver subsystem 813 uses the RF switch 809 to switch between the downlink receiver antennas 807 when scanning for downlink beacons. The RF switch output is delivered to the downlink receiver 812 via connection 810. The receiver controls the RF switch via data line 808.

FIG. 8

In certain cases, the local LMU (co-located with the Base Station or Node B) may not be able to synchronize with every sector of the cell due to co-channel interference from adjacent sectors, LMU downlink receiver antenna placement or antenna receiver saturation. In this case, the WLS may use a downlink receiver antenna of a proximate LMU to synchronize with the sector(s) in question. In one embodiment, the downlink receiver antenna is a highly directional antenna aimed at the neighboring site(s) downlink transmission antenna(s).

FIG. 9

Figure 9:
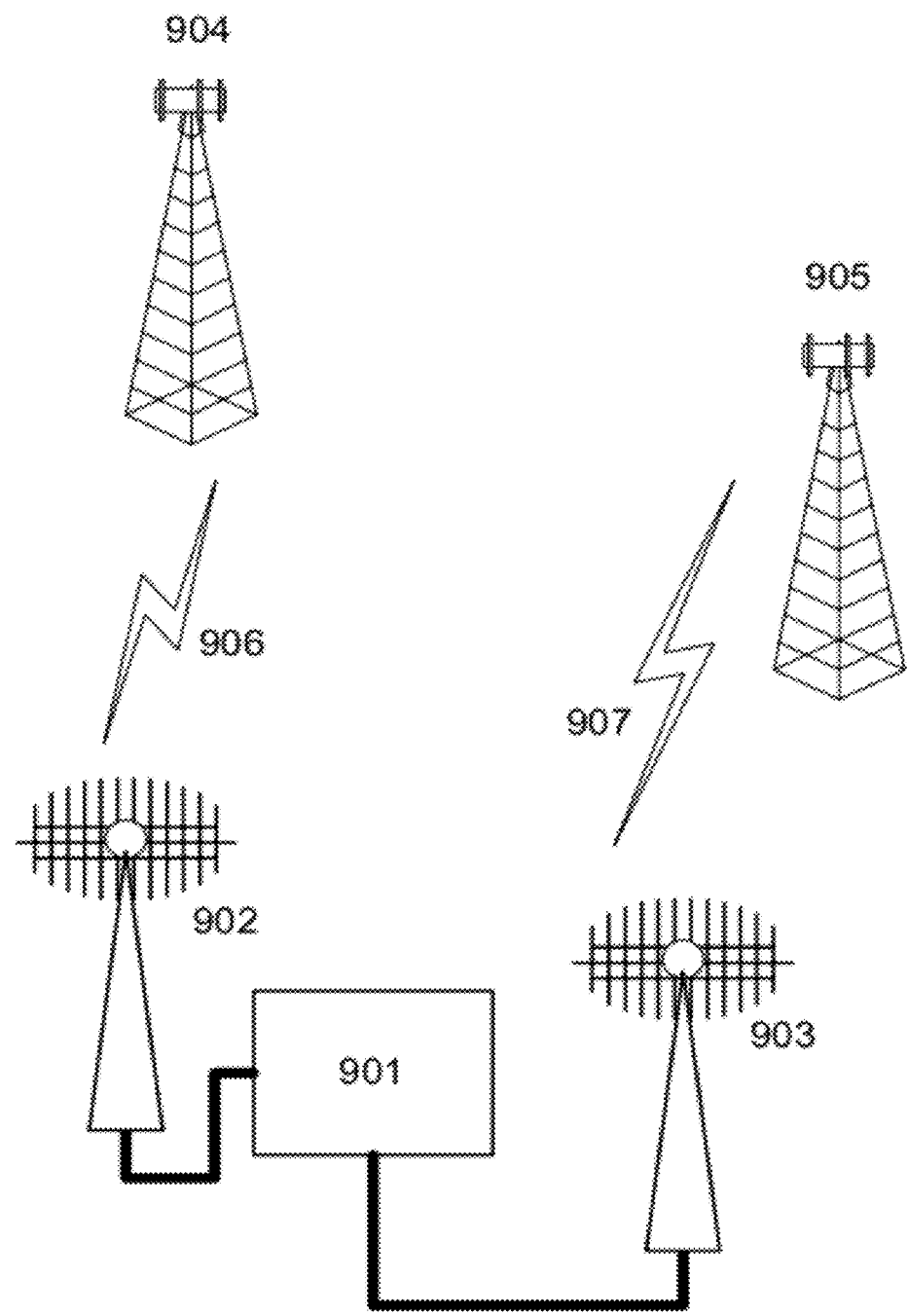
FIG. 9 depicts the subsystems of a directional antenna interference cancellation downlink receiver system in use.

FIG. 9 shows an example for signal interference mitigation using directional antenna. The downlink radio receiver subsystem 910 (shown here as a standalone unit simply for the purpose of illustrative clarity) is served by two directional antenna arrays (902 and 903.) The first antenna 902 serves to collect the radio downlink signals 906 from one or more sectors of the first base station 904. The second antenna array 903 serves to collect the radio downlink signals 907 from one or more sectors of the second base station 905. Directional antenna can be used in conjunction with the switched and spatial interference cancellation methods described above.

The true scope the present invention is not limited to the presently preferred embodiments disclosed herein. For example, the foregoing disclosure of a presently preferred embodiment of a Wireless Location System uses explanatory terms, such as the Serving Mobile Location Center (SMLC), Global Mobile Location Center (GMLC), Location Measuring Unit (LMU), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the invention is not limited to systems employing LMUs constructed as described above. The LMUs, SMLCs, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LMU) described herein to another functional element (such as the NodeB) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed:

1. A method for use by a wireless location system (WLS) associated with a CDMA-based wireless communications network (WCN), comprising:

receiving, at a first location measuring unit (LMU), a CDMA downlink signal broadcast by a sector of a base station;

determining, by the first LMU, sector timing information for the sector in response to synchronizing with the downlink signal, wherein the determination of sector timing information comprises, determining slot timing information from a received downlink primary synchronization channel;

determining frame timing information and a scrambling code group for the sector from a received secondary synchronization channel;

determining a scrambling code for the sector from the scrambling code group for the sector and a downlink common pilot channel for the sector; and determining a frame number and a sector identifier for the sector;

sending the sector timing information from the first LMU to a second LMU;

receiving, at the first and second LMUs, uplink signals from a mobile device communicating with the sector of the base station;

determining, at the first and second LMUs, time of arrival information for the uplink signals received at the first and second LMUs using the sector timing information; and determining a geographic location of the mobile device using the time of arrival information.

2. The method of claim 1, wherein determining sector timing information in response to synchronizing with the downlink signal further comprises:

determining sector timing information in response to synchronizing with a downlink beacon signal.

3. The method of claim 1, wherein determining sector timing information in response to synchronizing with the downlink signal further comprises:

determining sector timing information in response to synchronizing with a downlink pilot signal.

4. The method of claim 1, wherein determining sector timing information in response to synchronizing with the downlink signal further comprises:

determining slot timing information in response to synchronizing with a downlink primary synchronization channel.

5. The method of claim 1, wherein determining sector timing information in response to synchronizing with the downlink signal further comprises:

determining frame timing information in response to synchronizing with a downlink secondary synchronization channel.

6. The method of claim 1, wherein determining sector timing information in response to synchronizing with the downlink signal further comprises:

determining a frame number and sector identifier for the sector serving the mobile device in response to synchronizing with a broadcast control channel for the sector.

7. The method of claim 1, further comprising:

selecting the first LMU from a group of LMUs in response to determining that the uplink signal received at the first LMU is stronger than the uplink signals received by other LMUs in the group of LMUs.

8. The method of claim 1, wherein receiving the CDMA downlink signal broadcast by the sector of the base station further comprises:

receiving, at the first LMU, the CDMA downlink signal broadcast by the sector, wherein the first LMU is co-located with the base station.

9. The method of claim 1, further comprising:

aiming an antenna for the first LMU at a downlink antenna of the base station, wherein the first LMU is co-located with a second base station.

10. The method of claim 1, further comprising:

determining sector timing information for the sector using a scrambling code for the sector received from the WLS.

11. A method for use by a wireless location system (WLS) associated with a CDMA-based wireless communications network (WCN), comprising:

receiving, at a first location measuring unit (LMU), a CDMA downlink signal broadcast by a sector of a base station;

determining, by the first LMU, sector timing information for the sector, wherein the determination of sector timing information for the sector comprises determining slot timing information from a downlink primary synchronization channel; determining frame timing information from a secondary synchronization channel; determining a scrambling code for the sector; and determining a frame number for the sector;

sending the sector timing information from the first LMU to a second LMU;

receiving, at the first and second LMUs, uplink signals from a mobile device communicating with the sector of the base station; and determining, at the first and second LMUs, time of arrival information for the uplink signals received at the first and second LMUs using the sector timing information;

wherein receiving a CDMA downlink signal broadcast by a sector of a base station comprises:

generating a plurality of weight value sets;

sequentially configuring an adaptive antenna array in accordance with each weight value set and sampling the downlink signal;

determining, for each weight value set, signal strength information for samples of the downlink signal;

selecting a weight value set from the group based on the signal strength information determined for each sample of the downlink signal; and storing the selected weight value set for the sector.

12. The method of claim 11, further comprising:

determining, from a received downlink primary synchronization channel, slot timing information for the sector;

determining, from a received secondary synchronization channel, frame timing information and a scrambling code group for the sector; and determining, using the scrambling code group for the sector and a downlink common pilot channel for the sector, the scrambling code for the sector.

13. The method of claim 11, further comprising:

selecting the adaptive antenna array from a group of geographically dispersed adaptive antenna arrays to receive the CDMA downlink signal based on the strength of the sampled downlink signal at the adaptive antenna array.

14. A wireless location system, comprising:
a first antenna array;
a weight control system configured to adjust weight values for the first antenna array to cause a downlink signal associated with a sector of a base station to be detected;
a first location measuring unit (LMU) configured to synchronize with the detected downlink signal, thereby obtaining sector timing information for the sector, wherein the first LMU is configured to obtain sector timing information by,
  determining, from a received downlink primary synchronization channel, slot timing information;
  determining, from a received secondary synchronization channel, frame timing information and a scrambling code group for the sector;
  determining, from the scrambling code group for the sector and a downlink common pilot channel for the sector, a scrambling code for the sector; and
  determining, using the scrambling code for the sector, a frame number and a sector identifier for the sector; and
a second LMU configured to receive the determined sector timing information for the detected downlink signal from the first LMU;
wherein the first and second LMUs are configured to use the sector timing information to determine time of arrival information for uplink signals from a mobile device communicating with the sector; and
a servicing mobile location center configured to determine a geographic location of the mobile device using the time of arrival information determined by the first and second LMUs.

15. The wireless location system of claim 14, wherein the downlink signal is a common pilot channel for the sector.

16. The wireless location system of claim 14, wherein the sector timing information comprises slot timing information obtained from a primary synchronization channel for the sector.

17. The wireless location system of claim 14, wherein the sector timing information comprises frame timing information obtained from a secondary synchronization channel for the sector.

18. The wireless location system of claim 14, wherein the sector timing information comprises frame number information obtained from a broadcast control channel for the sector.

19. The wireless location system of claim 14, further comprising:
a switch configured to select the first antenna array from a group of antenna arrays, wherein each antenna array in the group is positioned at a different location relative to the first LMU.

20. The wireless location system of claim 14, wherein the weight control system is configured to:
adjust sets of weight values;
sample the downlink signal;
determine the ratio of Energy per Bit (Eb) to the Spectral Noise Density (No) (Eb/No) for each sample of the downlink signal; and
select the set of weight values that is associated with a sample of the downlink signal that has an Eb/No ratio greater than a threshold.

21. The wireless location system of claim 14 wherein the first antenna array is a directional array aimed at a downlink transmission antenna of the base station, wherein the first antenna array is co-located with a second base station.

22. A wireless location system including a servicing mobile location center configured to determine a geographic location of a mobile device using time of arrival information determined by a first location measuring unit and a second location measuring unit, wherein the first location measuring unit and the second location measuring unit are configured to determine the time of arrival information from uplink CDMA signals transmitted by the mobile device and sector timing information for the sector serving the mobile device, the first location measuring unit comprising:
means for determining sector timing information for a sector of a base station in response to synchronizing with a downlink signal transmitted by the sector, wherein the means for determining sector timing information comprises means for determining slot timing information, means for determining frame timing information, means for determining a scrambling code for the sector, and means for determining a frame number for the sector;
means for receiving a signal indicating that the mobile device is communicating with the sector; and
means for sending the sector timing information to the second location measuring unit.

23. The first location measuring unit of claim 22, further comprising:
means for selecting a downlink receiver subsystem from a group of downlink receiver subsystems positioned at different locations relative to the first location measuring unit, wherein the downlink receiver subsystem is configured to receive the downlink signal transmitted by the sector.

24. The first location measuring unit of claim 22, further comprising:
means for selecting a weight value set for a downlink receiver subsystem from a group of weight value sets that maximizes the ratio of Energy per Bit (Eb) to the Spectral Noise Density (No) (Eb/No) for the downlink signal.

25. The first location measuring unit of claim 22, wherein the means for determining sector timing information for the sector of the base station in response to synchronizing with the downlink signal transmitted by the sector further comprise:
means for determining sector timing information in response to synchronizing with a downlink beacon signal.

26. The first location measuring unit of claim 22, wherein the means for determining sector timing information further comprise:
means for determining sector timing information in response to synchronizing with a downlink pilot signal.

27. The first location measuring unit of claim 22, wherein the means for determining sector timing information further comprise:
means for determining slot timing information in response to synchronizing with a downlink primary synchronization channel.

28. The first location measuring unit of claim 22, wherein the means for determining sector timing information further comprise:
means for determining frame timing information in response to synchronizing with a downlink secondary synchronization channel.

29. The first location measuring unit of claim 22, wherein the means for determining sector timing information further comprise:

means for determining a frame number and sector identifier for the sector in response to synchronizing with a broadcast control channel for the sector.

30. A method for use by a first location measuring unit configured to operate within a wireless location system, the wireless location system including a servicing mobile location center configured to determine a geographic location of a mobile device using time of arrival information received from the first location measuring unit and a second location measuring unit, the method comprising:
   aiming an antenna of a downlink receiver subsystem at a downlink antenna for a sector of a base station, the base station co-located with the second location measuring unit;
   detecting a downlink signal transmitted by the sector;
   synchronizing with the downlink signal, thereby obtaining sector timing information for the sector, wherein obtaining sector timing information comprises,
      determining, from a received downlink primary synchronization channel, slot timing information;
      determining, from a received secondary synchronization channel, frame timing information and a scrambling code group for the sector;
      determining, from the scrambling code group for the sector and a downlink common pilot channel for the sector, a scrambling code for the sector; and
      determining, using the scrambling code for the sector, a frame number and a sector identifier for the sector;
   sending the sector timing information to the second location measuring unit;
   determining, using the sector timing information, time of arrival information for the uplink signals; and
   sending the determined time of arrival information to the servicing mobile location center.

31. The method of claim 30, further comprising:
   generating a plurality of weight value sets;
   sequentially configuring antennas of the downlink receiver subsystem in accordance with each weight value set and sampling the downlink signal;
   determining, for each weight value set, signal strength information for samples of the downlink signal;
   selecting a weight value set from the plurality based on the signal strength information for the samples determined for each weight value set; and
   storing the selected weight value set for the sector.

32. The method of claim 30, further comprising:
   selecting the downlink receiver subsystem from a group of geographically dispersed downlink receiver subsystems based on the strength of a sampled downlink signal at the downlink receiver subsystem.

33. A non-transitory computer-readable storage medium for use in a wireless location system that includes a servicing mobile location center configured to determine the geographic location of a mobile device from time of arrival information generated by at least a first location measuring unit (LMU) and a second LMU, wherein the group of LMUs is configured to generate the time of arrival information from uplink CDMA signals transmitted by the mobile device and sector timing information for a sector servicing the mobile device, the computer-readable storage medium comprising instructions that upon execution cause the first LMU to:
   direct a plurality of geographically dispersed downlink receiver subsystems to measure signal strength of a downlink signal of a sector;
   select a downlink receiver subsystem from the plurality based on the signal strength of the downlink signal at each of the geographically dispersed downlink receiver subsystems;
   determine sector timing information for the sector in response to synchronizing with the downlink signal detected by the selected downlink receiver subsystem, wherein the determination of sector timing information comprises,
      determining, from a received downlink primary synchronization channel, slot timing information;
      determining, from a received downlink secondary synchronization channel, frame timing information and a scrambling code group for the sector;
      determining, from the scrambling code group for the sector and a downlink common pilot channel for the sector, a scrambling code for the sector; and
      determining, using the scrambling code for the sector, a frame number and a sector identifier for the sector;
   send the sector timing information to the second LMU; and
   send time of arrival information determined from an uplink signal transmitted by the mobile device and the sector timing information to the servicing mobile location center.

34. The non-transitory computer-readable storage medium of claim 33, wherein the instructions that upon execution cause the first LMU to determine sector timing information further comprise instructions that upon execution cause the first LMU to:
   determine slot timing information in response to synchronizing with a downlink primary synchronization channel.

35. The non-transitory computer-readable storage medium of claim 33, wherein the instructions that upon execution cause the first LMU to determine sector timing information further comprise instructions that upon execution cause the first LMU to:
   determine frame timing information in response to synchronizing with a downlink secondary synchronization channel.

36. The non-transitory computer-readable storage medium of claim 33, wherein the instructions that upon execution cause the first LMU to determine sector timing information further comprise instructions that upon execution cause the first LMU to:
   determine a frame number and sector identifier for the sector serving the mobile device in response to synchronizing with a broadcast control channel for the sector.

* * * * *